United States Patent Office 3,671,216
Patented June 20, 1972

3,671,216
HERBICIDAL COMPOSITIONS
Masaru Kado, Yokohama, Ichiro Kimura, Ogasa-gun, Shizuoka, and Hironari Sugiyama, Shimizu, Japan, assignors to Kumiai Chemical Industry Co., Ltd., and Hodogaya Chemical Co., Ltd., Tokyo, Japan
No Drawing. Filed Feb. 4, 1970, Ser. No. 8,715
Claims priority, application Japan, Feb. 6, 1969, 44/8,582
Int. Cl. A01n 9/12
U.S. Cl. 71—100    10 Claims

ABSTRACT OF THE DISCLOSURE

Herbicidal compositions having a synergistic activity, which comprises a herbicidally effective amount of a mxture of a thiocarbamate having a defined chemical formula and a diphenyl ether having a defined chemical formula. The herbicidal compositions can control perennial weeds as well as annual broad-leaved weeds from germinating period to growing period.

---

This invention relates to novel herbicidal compositions which contain, in combination, two herbicidally actve compounds, and also relates to a process for employing said compounds in the control of undesirable vegetation.

The present invention consists in a herbicidal composition comprising as the essential active ingredients (a) a thiocarbamate having the general formula:

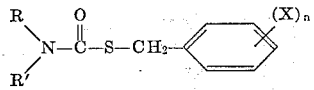

wherein R, R' are selected from the group consisting of hydrogen and a lower alkyl, X is selected from the group consisting of halogen and methyl and n is a whole number of from 0 to 2 and (b) a diphenyl ether having the general formula:

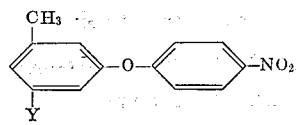

wherein Y is selected from the group consisting of hydrogen and methyl and an inert carrier.

The present invention makes it possible to control weeds in growing period as well as to control weeds in germination period, which has been hitherto effected by the known germination inhibitor, thereby a period of the treatment against weeds is widened from germinating period to growing period.

Thus, for example, the present invention provides a herbicide for controlling completely perennial weeds such as *Eleocharis acicularis* which cannot hitherto be inhibited by chemical treatment during growing of paddy rice plant as well as general broad-leaved weeds such as *Panicum crus-galli, Cyperus microiria, Monochoria vaginalis* and the like without anxieties of phytotoxicity against rice plant and fish poison. Recently, there have been developed and applied various kinds of herbicides. Thus, for example, pentachlorophenol, which is used broadly as herbicide for paddy field, is effective to control Giamineae weeds such as *Panicum crus-galli, Digitaria adscendens* and annual broad-leaved weeds such as *Monochoria vaginalis, Elatine triandra* and the like, but cannot control perennial weeds such as *Cyperus serotinus, Eleocharis acicularis* and the like.

Also, 2,4-dichlorophenoxyacetic acid and its salt are effective to control broad-leaved weeds such as *Monochoria vaginalis*, but are less effective for Giamineae weed such as *Panicum crus-galli* than pentachlorophenol and is not effective for perennial weeds such as *Eleocharis acicularis, Cyperus serotinus* and the like. As the result of the continuous uses of said pentachlorophenol and 2,4-D said perennial weeds recently grow thick at paddy fields, thereby the growth of paddy rice plant is inhibited. Therefore, the farmers have gotten anxious for controlling thereof.

Since many *Eleocharis acicularis* generates from period of scarifying of seeding to about 2 weeks after rice-transplantation, it is very difficult to determine the precise period of the treatment. Pentachlorophenol and known diphenyl ether are useful at the initial generating period of weeds, but reduced remarkably in the effects at the growing period. Thus, the use past 10 days after rice-transplantation is scarcely hard in success of herbicidal effect thereof. Even if the herbicidal effect is completed by early treatment, it is impossible to control weeds which are generated past 10 days after rice-transplantation.

In view of these facts, most effective and ideal controlling period, namely, period of treating with herbicide in paddy fields may be a period that weeds grow uniformly. However, there have hitherto been no herbicides which may be satisfactory for the purpose. For the recent labor shortage in farming country and the reasonable division of labor at rice-transplantation, it has been required to develop a novel herbicide which can control weeds generated in the whole period for a long term by treating at one time.

As a result of many attempts to develop a herbicide being capable of controlling non-selectively weeds, the present inventors are successful in obtaining a novel herbicide comprising diphenyl ether and thiocarbamate represented by foregoing general formulae.

One ingredient, a diphenyl ether of the present invention is exemplified as follows:

4-nitro-3'-methyldiphenyl ether (hereinafter, referred to NME)

4-nitro-3',5'-dimethyldiphenyl ether (hereinafter, referred to NDME)

As the other ingredient, mention may be made of

S-(4-chlorobenzyl) - N,N - diethylthiocarbamate (hereinafter, referred to compound 4), B.P. 127–131° C./0.12 mm. Hg S-(2,4 - dichlorobenzyl) - N,N - diisopropylthiocarbamate B.P. 142–144° C./0.02 mm. Hg S - (4 - methylbenzyl) - N,N - diethylthiocarbamate (hereinafter, referred to compound 7), B.P. 107–115°C./0.002 mm. Hg S-(2 - chlorobenzyl) - N - methylthiocarbamate (hereinafter, referred to compound 1), B.P. 143–147° C./0.03 mm. Hg S-(2 - bromobenzyl) - N,N - diisopropylthiocarbamte (hereinafter, referred to compound 5), B.P. 152–156° C./0.04 mm. Hg S-(2 - methylbenzyl) - N,N - di - n - butylthiocarbamate (hereinafter, referred to compound 2), B.P. 108–112° C./0.04–0.05 mm. Hg S-(2 - chlorobenzyl) - N,N - diisopropylthiocarbamate, B.P. 142–146° C./0.04–0.05 mm. Hg S-(3,4 - dichlorobenzyl) - N,N-di-n-propylthiocarbamate, B.P. 167–170° C./0.007 mm. Hg S - (3,4 - dichlorobenzyl) - N,N - dimethylthiocarbamate, B.P. 150–165° C./0.02 mm. Hg S - (4 - bromobenzyl) - N,N - diethylthiocarbamate, M.P. 37–38° C.

S-(4 - bromobenzyl - N,N - di - n - propylthiocarbamate, B.P. 159–161° C./0.05 mm. Hg S - (3,4 - dichlorobenzyl) - N,N - diethylthiocarbamate (hereinafter, referred to compound 3), B.P. 138–142° C./0.02 mm. Hg S-(2,5 - dimethylbenzyl) - N,N - diethylthiocarbamate (hereinafter, referred to compound 6), B.P. 145–147° C./0.2 mm. Hg S - (4 - bromobenzyl) - N,N - diisopropylthiocarbamate, B.P. 150–152° C./0.05 mm. Hg S - (2,5 - dimethylbenzyl) - N,N - di - n - propylthiocarbamate, B.P. 146° C./0.1 mm. Hg S - (3,4 - dimethylbenzyl) - N,N - di-n-propylthiocarbamate, B.P. 137–141° C./0.005 mm. Hg S -(2,5 - dichlorobenzyl) - N,N - dimethylthiocarbamate (hereinafter, referred to compound 8), B.P. 148–150° C./0.06 mm. Hg These thiocarbamates themselves have herbicidal activity, and are effective at a period from just after rice-transplantation to 7–10 days past the transplantation.

We have now found that, by using a combination of NME or NDME with one of said thiocarbamates, the deficiencies noted in respect of the individual compounds can be obviated. We have found further that, surprisingly and unexpectedly, the above two types of herbicides act synergistically in combination, that is each potentiates the activity of the other when used in combination. It has been found that NME or NDME is effective 20 days after rice-transplatation by mixing a thiocarbamate.

Especially, it has not only remarkably herbicidal effect on *Panicum crus-galli* at the 2–3 leaf stage, when the control is very difficult, but also shows good eradication of *Eleocharis acicularis* which may be difficult to kill by means of a single NME or NDME. The facts apply to the case of annual broad-leaved weeds, and the present invention makes it possible to kill the weeds which have never been controlled after the germination, by treating the weeds with the compositions of the present invention.

The use of the herbicide according to the present invention at the latter period after rice-transplation is not only desirable in a point of division of labor, but also gives the following advantages:

(1) There is no anxiety on root damage of paddy rice plant by phytotoxicity.
(2) The period of controlling weeds is elongated.
(3) The amount of chemicals flowed out downwardly into soil decreases as compared with that in the early treatment, because leakage of water into soil is gradually decreased.
(4) Air-spraying of the chemicals, which is hitherto impossible because of being short in the application period, can be carried out.

As mentioned above, the present invention is safe to paddy rice plant at the time of complete weed control by treatment with chemicals at a high quantity, and effective against grown weeds. That is, the composition of the invention is characterized by elongating the application period. Achievement of such function has never been realized by employment of the hitherto known herbicide. And there have been numerous indistinct points in the mechanism, but the superiority is supposed to be due to the formation of a stable soil-treating layer by mixing thiocarbamate compound having the aforesaid general formula with NME or NDME.

Mixing ratio of the composition of the present invention is desirable in a proportion of thiocarbamate compound to NME or NDME of 1:0.3–3 by weight, and especially the maximum effect is obtained at the ratio near 1.

The composition of the invention can be prepared by incorporating solid carriers such as bentonite, clay and talc or a binder, or an inert carrier such as surfactant to thiocarbamate and diphenyl ether.

The most effective formulation of the present composition is granule. That is, it is produced by steps of diluting the active ingredients with inert solid carriers such as bentonite, clay, talc and lime, kneading with a binder, selected from the group consisting of sodium alkylbenzenesulfonate, polyvinyl alcohol (PVA) and sodium ligninesulfonate, together with water, extruding kneaded mass into granules, thereafter drying them or by dissolving the active ingredient in a proper solvent and absorbing the resulting solution uniformly into granular diatomaceous earth and vermiculite.

On the use, said granule can be scattered uniformly by hand or by a machine and a helicopter. However, in some case, it may, of course, be possible to employ in wettable powder obtained by mixing with an inert solid carrier and surfactant or in emulsifiable concentration obtained by mixing a solvent and a surfactant or in dust obtained by mixing an inert solid carrier directly or after diluting with water. And, if necessary, it may also be allowable to mix with the other insecticide, fungicide, or herbicide.

The following examples will serve to set forth more specifically the present invention: Percent used in the examples means weight percentage.

EXAMPLE 1.—GRANULE

7% of S-(4-chlorobenzyl)-N,N-diethylthiocarbamate, 7% of NDME, 2% of sodium ligninesulfonate, 5% of white carbon and 79% of bentonite were uniformly crushed and mixed, and kneaded with a suitable amount of water, then granulated by means of an extrusion granulator, dried, thereafter sieved to 14–32 mesh to prepare the granular formulation.

EXAMPLE 2.—GRANULE

10% of S-(4-methylbenzyl)-N,N-diethylthiocarbamate, 5% of NDME, 48% of bentonite, 35.5% of clay, 1% of sodium alkylbenzenesulfonate and 0.5% of PVA were uniformly crushed and mixed, and a suitable amount of water was added thereto, the resulting mixture was formed into the granular formulation in the same manner as described in Example 1.

EXAMPLE 3.—GRANULE

5% of S-(4-bromobenzyl)-N,N-diethylthiocarbamate, 7.5% of NDME, 40% of calcium bicarbonate, 44.5% of clay, 1% of sodium alkylbenzenesulfonate and 2% of sodium lignine-sulfonate were prepared into the granular formulation in the same manner as described in Example 1.

EXAMPLE 4.—GRANULE

5% of solution, obtained by dissolving NDME in 5 times amount (by weight) of dimethylformamide, and 5% of S-(2,5-dichlorobenzyl)-N,N-dimethylthiocarbamate were uniformly absorbed into 90% of granular diatomaceous earth with 8–32 mesh to make the granular formulation.

EXAMPLE 5.—WETTABLE POWDER

20% of S-(4-chlorobenzyl)-N,N-diethylthiocarbamate, 20% of NME, 2% of wetting agent, sodium alkylbenzenesulfonate, 2% of dispersant, DEMOL (registered trademark, produced by Kao Atlas Co. Ltd.), 10% of white carbon, and 56% of diatomaceous earth were crushed and diluted with water to spray it.

EXAMPLE 6.—EMULSIFIABLE CONCENTRATION

25% of S-(4-chlorobenzyl)-N,N-diethylthiocarbamate, 15% of NDME, 15% of SORPOL (registered trademark, produced by Toho Chemical Industry Co., Ltd.) and 45% of xylene were mixed and dissolved, then on the use thereof, it was sprayed after diluting with water.

EXAMPLE 7.—DUST

5% of S-(4-bromobenzyl)-N,N-diethylthiocarbamate, 1.5% of NDME and 93.5% of diatomaceous earth were crushed and mixed homogeneously, and then were used as a dust.

The effect of the present herbicidal composition will be further illustrated with the following experimental examples.

Experimental Example 1

Synergistic effect test at initial germination of weed

*Eleocharis acicularis* and *Panicum crus-galli* at germination period, *Panicum crus-galli* at the 1 leaf-stage and 2 leaf-stage, and paddy rice plant at 3 leaf-stage were respectively planted on pots having 15 cm. in diameter. After water was flood in a depth of 3 cm., three kinds of granules, that is, one kind of granule containing a single component of S-(4-chlorobenzyl)-N,N-diethylthiocarbamate, one kind of granule containing a single component of NDME and the other kind of granule containing said two components (each component being 5%) were scattered on the pots respectively by hand, and numbers of weeds generated or weight and phytotoxicity of rice plant were investigated 15 days after the treatment. The results are shown in Table 1.

TABLE 1

| Sample chemicals | Amount used, g./10 a. | Number of *Eleocharis acicularis* | Weight of *Panicum crus-galli* (g.) Treating at germination period | Treating at 1 leaf stage | Treating at 2 leaf stage | Phytotoxicity |
|---|---|---|---|---|---|---|
| Single NDME 10% | 100 | 60 | 2.1 | 4.5 | 9.6 | None. |
| Do | 200 | 48 | 1.5 | 3.4 | 7.9 | Do. |
| Do | 300 | 32 | 1.4 | 2.5 | 6.1 | Do. |
| Single thiocarbamate 7% | 100 | 19 | 0.9 | 1.9 | 6.2 | Do. |
| Do | 200 | 8 | 0.5 | 1.4 | 3.4 | Do. |
| Do | 300 | 0 | 0 | 0 | 1.2 | Do. |
| Mixture, NDME 5% and the thiocarbamate 5%. | 50+50 | 3 | 0.1 | 0.1 | 0.6 | Do. |
| Do | 100+100 | 0 | 0 | 0 | 0.2 | Do. |
| Do | 150+150 | 0 | 0 | 0 | 0 | Do. |
| Non-treatment | | 68 | 3.1 | 5.9 | 12.6 | Do. |

Experimental Example 2

Synergistic effect test at initial germination of weed. Test method according to Experimental Example 1. The results are shown in Table 2.

TABLE 2

| Sample chemicals | Amount used, g./10 a. | Number of *Eleocharis acicularis* | Weight of *Panicum crus-galli* (g.) Treating at germination period | Treating at 1 leaf stage | Treating at 2 leaf stage | Phytotoxicity |
|---|---|---|---|---|---|---|
| Single NME 10% | 100 | 51 | 1.9 | 3.6 | 9.6 | None. |
| Do | 200 | 38 | 1.6 | 2.1 | 6.8 | Do. |
| Do | 300 | 24 | 1.1 | 1.8 | 4.1 | Do. |
| Single Compound 1,[1] 7% | 100 | 24 | 1.0 | 2.1 | 7.6 | Do. |
| Do.[1] | 200 | 9 | 0.2 | 1.7 | 5.3 | Do. |
| Do.[1] | 300 | 0 | 0 | 0.8 | 2.7 | Do. |
| Single Compound 2,[1] 7% | 100 | 29 | 0.1 | 1.9 | 8.1 | Do. |
| Do.[1] | 200 | 11 | 0 | 1.1 | 6.3 | Do. |
| Do.[1] | 300 | 1 | 0 | 0.5 | 3.1 | Do. |
| Mixture, NME 5% and Compound 1,[1] 5%. | 50+50 | 2 | 0 | 0.2 | 0.6 | Do. |
| Do.[1] | 100+100 | 0 | 0 | 0 | 0.1 | Do. |
| Do.[1] | 150+150 | 0 | 0 | 0 | 0 | Do. |
| Mixture, NME 5% and Compound 3,[1] 5%. | 50+50 | 4 | 0 | 0.3 | 0.8 | Do. |
| Do.[1] | 100+100 | 0 | 0 | 0 | 0.2 | Do. |
| Do.[1] | 150+150 | 0 | 0 | 0 | 0 | Do. |
| Mixture, NME 5% and Compound 4,[1] 5%. | 50+50 | 0 | 0 | 0.1 | 0.5 | Do. |
| Do.[1] | 100+100 | 0 | 0 | 0 | 0.1 | Do. |
| Do.[1] | 150+150 | 0 | 0 | 0 | 0 | Do. |
| Mixture, NME 5% and Compound 5,[1] 5%. | 50+50 | 2 | 0.1 | 0.2 | 0.8 | Do. |
| Do.[1] | 100+100 | 0 | 0 | 0 | 0.2 | Do. |
| Do.[1] | 150+150 | 0 | 0 | 0 | 0 | Do. |
| Mixture, NME 5% and Compound 6,[1] 5%. | 50+50 | 3 | 0 | 0.2 | 1.6 | Do. |
| Do.[1] | 100+100 | 0 | 0 | 0 | 0.5 | Do. |
| Do.[1] | 150+150 | 0 | 0 | 0 | 0 | Do. |
| Mixture, NME 5% and Compound 2,[1] 5%. | 50+50 | 2 | 0.1 | 0.3 | 1.1 | Do. |
| Do.[1] | 100+100 | 0 | 0 | 0 | 0.2 | Do. |
| Do.[1] | 150+150 | 0 | 0 | 0 | 0 | Do. |
| Non-treatment | | 65 | 2.4 | 4.3 | 11.6 | Do. |

[1] Compound 1=S-(2-chlorobenzyl)-N-methylthiocarbamate; Compound 2=S-(2-methylbenzyl)-N,N-di-n-butylthiocarbamate; Compound 3=S-(3,4-dichlorobenzyl)-N,N-diethylthiocarbamate; Compound 4=S-(4-chlorobenzyl)-N,N-diethylthiocarbamate; Compound 5=S-(2-bromobenzyl)-N,N-diisopropylthiocarbamate; Compound 6=S-(2,5-dimethylbenzyl)-N,N-diethylthiocarbamate.

Experimental Example 3

Test method according to Experimental Example 1.
The results are shown in Table 3.

TABLE 3

| Sample chemicals | Amount used, g./10 a. | Number of Eleocharis acicularis | Weight of Panicum crus-galli (g.) | | | Phyto-toxicity |
| --- | --- | --- | --- | --- | --- | --- |
| | | | Treating at germination period | Treating at 1 leaf stage | Treating at 2 leaf stage | |
| Single NDME 10% | 100 | 60 | 2.1 | 4.5 | 9.6 | None. |
| Do | 200 | 48 | 1.5 | 5.4 | 7.9 | Do. |
| Do | 300 | 32 | 1.4 | 2.5 | 6.1 | Do. |
| Single compound 1, 7% | 100 | 28 | 1.4 | 2.9 | 10.2 | Do. |
| Do | 200 | 11 | 0.6 | 2.0 | 7.3 | Do. |
| Do | 300 | 0 | 0.1 | 1.2 | 4.2 | Do. |
| Single compound 2, 7% | 100 | 27 | 0.2 | 2.6 | 9.6 | Do. |
| Do | 200 | 14 | 0.4 | 1.5 | 5.6 | Do. |
| Do | 300 | 2 | 0 | 0.8 | 3.5 | Do. |
| Mixture, NDME 5% and compound 1, 5% | 50+50 | 4 | 0.2 | 0.2 | 0.8 | Do. |
| Do | 100+100 | 0 | 0 | 0 | 0.2 | Do. |
| Do | 150+150 | 0 | 0 | 0 | 0 | Do. |
| Mixture, NDME 5% and Compound 3, 5% | 50+50 | 5 | 0.2 | 0.2 | 1.0 | Do. |
| Do | 100+100 | 1 | 0 | 0 | 0.3 | Do. |
| Do | 150+150 | 0 | 0 | 0 | 0 | Do. |
| Mixture, NDME 5% and Compound 4, 5% | 50+50 | 6 | 0.3 | 0.4 | 0.2 | Do. |
| Do | 100+100 | 1 | 0 | 0.1 | 0.1 | Do. |
| Do | 150+150 | 0 | 0 | 0 | 0 | Do. |
| Mixture, NDME 5% and Compound 5, 5% | 50+50 | 3 | 0.3 | 0.4 | 0.9 | Do. |
| Do | 100+100 | 0 | 0 | 0 | 0.1 | Do. |
| Do | 150+150 | 0 | 0 | 0 | 0 | Do. |
| Mixture, NDME 5% and Compound 2, 5% | 50+50 | 4 | 0.2 | 0.4 | 1.2 | Do. |
| Do | 100+100 | 0 | 0 | 0 | 0.3 | Do. |
| Do | 150+150 | 0 | 0 | 0 | 0 | Do. |
| Non-treatment | | 68 | 3.1 | 5.9 | 12.6 | Do. |

Experimental Example 4

Herbicidal effect test 20 days after transplantation of rice plant.

Paddy field 20 days after transplantation of rice plant was divided into area of 10 m.$^2$ per block, and granule containing S - (4 - chlorobenzyl) - N,N - diethylthiocarbamate and NDME was applied at a rate of 3 kg. and 4 kg. per 10 areas. Numbers of weeds generated in area of 1 m.$^2$ of test block were investigated after 30 days, and simultaneously phytotoxicity against paddy rice plant was tested. The results are shown in Table 4.

Experimental Example 5

Herbicidal effect test 20 days after transplantation of rice plant.

Paddy field 20 days after transplantation of rice plant was divided into areas of 10 m.$^2$ per block, and granule containing thiocarbamate and NDME was applied at a rate of 2 kg. and 3 kg. per 10 areas. Number of weeds generated in area of 1 m.$^2$ of test block were investigated after 30 days, and simultaneously phytotoxicity against paddy rice plant was tested. The results are shown in Table 5.

TABLE 4

| Sample chemicals | Amount used, kg./10 a. (composition) | Number of generating weeds | | | Eleocharis acicularis (g.) | Phyto-toxicity |
| --- | --- | --- | --- | --- | --- | --- |
| | | A[1] | B[1] | C[1] | | |
| Single thiocarbamate 5% | 3 | 21 | 18 | 23 | 38 | None. |
| Do | 4 | 14 | 13 | 18 | 25 | Do. |
| Single NDME 7.5% | 3 | 29 | 26 | 21 | 54 | Do. |
| Do | 4 | 23 | 21 | 16 | 41 | Do. |
| Mixture, thiocarbamate 5% and NDME 7.5% | 3 | 5 | 4 | 4 | 6 | Do. |
| Do | 4 | 3 | 2 | 2 | 2 | Do. |
| NIP[2] granule 7% (commercial) | 3 | 37 | 28 | 29 | 64 | Do. |
| Do.[2] | 4 | 34 | 27 | 24 | 59 | Do. |
| Non-treatment | | 36 | 29 | 31 | 68 | Do. |

[1] A shows number of Panicum crus-galli, B shows number of Cyperus microiria, C shows number of Monochoria vaginalis.
[2] 4-nitro-2',4'-dichlorodiphenyl ether.

TABLE 5

| Sample chemicals | Amount used, kg./10a. (composition) | Number of generating weeds | | | Eleocharis acicularis (g.) | Phytotoxicity |
| --- | --- | --- | --- | --- | --- | --- |
| | | A | B | C | | |
| Mixture, NDME 5% and Compound 5, 5%. | 2 | 6 | 4 | 1 | 13 | None. |
| Do | 3 | 2 | 2 | 0 | 0 | Do. |
| Mixture, NDME 5% and Compound 7 [1], 5%. | 2 | 5 | 4 | 3 | 11 | Do. |
| Do [1] | 3 | 1 | 1 | 0 | 2 | Do. |
| Mixture, NDME 5% and Compound 8 [1], 5%. | 2 | 6 | 5 | 1 | 14 | Do. |
| Do [1] | 3 | 1 | 1 | 0 | 3 | Do. |
| MO [2] granule 7% | 4 | 30 | 35 | 19 | 42 | Do. |
| MO [2] granule 7% (commercial) | 6 | 21 | 24 | 10 | 28 | Slight. |
| Non-treatment | | 38 | 48 | 29 | 64 | None. |

[1] Compound 7=S-(4-methylbenzyl)-N,N-diethylthiocarbamate; Compound 8=S-(2,5 dichlorobenzyl)-N,N-dimethylthiocarbamate.
[2] 4-nitro-2',4',6',-trichlorodiphenyl ether.

What is claimed is:

1. A herbicidal composition comprising a herbicidally effective amount of a mixture of a thiocarbamate having the general formula:

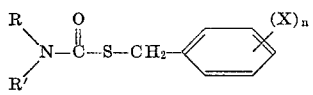

wherein R, R' are selected from the group consisting of hydrogen and a lower alkyl, X is selected from the group consisting of halogen and methyl and $n$ is a whole number of from 0 to 2, and a synergistic proportion of a diphenyl ether having the general formula:

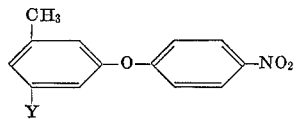

wherein Y is selected from the group consisting of hydrogen and methyl and an inert carrier.

2. A herbicidal composition according to claim 1, in which the ratio of diphenyl ether and thiocarbamate are 0.3–3:1 by weight.

3. A herbicidal composition according to claim 1, in which the thiocarbamate is a compound represented by the general formula:

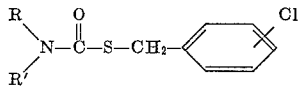

wherein R, R' are lower alkyl groups.

4. A herbicidal composition according to claim 1, in which the thiocarbamate is a compound represented by the general formula:

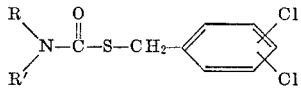

wherein R, R' are lower alkyl groups.

5. A herbicidal composition according to claim 1, in which the thiocarbamate is a compound represented by the general formula:

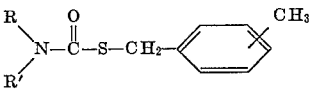

wherein R, R' are lower alkyl groups.

6. A granular herbicidal composition as claimed in claim 1, which comprises an inert solid carrier and a diphenyl ether and a thiocarbamate.

7. An emulsifiable concentration herbicidal composition as claimed in claim 1, which comprises a solvent, a surfactant and a diphenyl ether and a thiocarbamate.

8. A method for controlling weeds, which comprises applying thiocarbamate represented by the general formula:

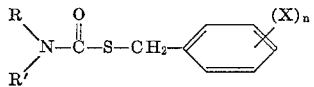

wherein R, R' are selected from the group consisting of hydrogen and a lower alkyl, X is selected from the group consisting of halogen and methyl and $n$ is a whole number of from 0 to 2 and a diphenyl ether represented by the general formula:

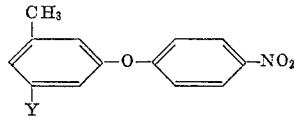

wherein Y is selected from the group consisting of hydrogen and methyl at an amount of the herbicidal effect to undesirable weeds.

9. In the method as claimed in claim 8, a method for controlling undesirable weeds of paddy field, which comprises applying the thiocarbamate and the diphenyl ether to paddy field soil.

10. In the method for controlling weeds as claimed in claim 8, a method which comprises using S-(4-chlorobenzyl) - N,N - diethylthiocarbamate and 4-nitro-3',5'-dimethyldiphenyl ether.

References Cited

FOREIGN PATENTS 282,742    1/1965    Netherlands    71—118
4,329,024  7/1965    Japan          71—100

JAMES O. THOMAS, Jr., Primary Examiner

U.S. Cl. X.R.

71—123